Figure 1:
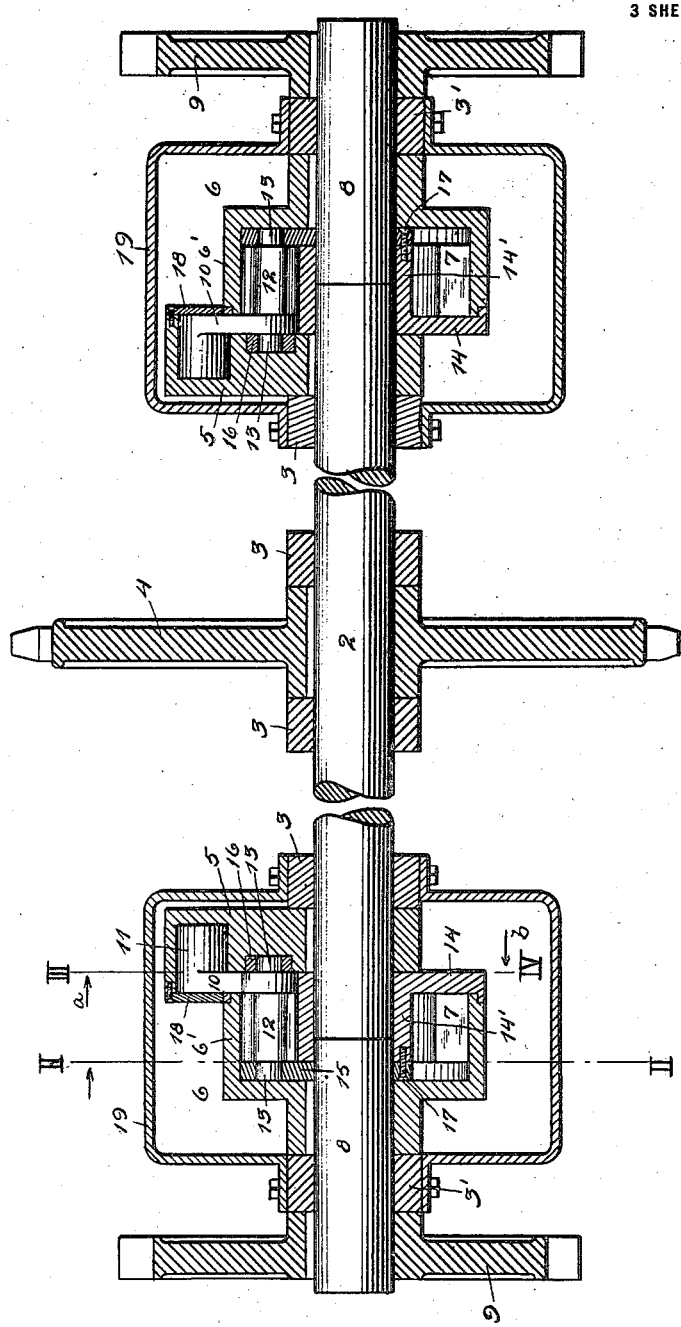

C. W. LEVALLEY.
TRANSMISSION GEARING.
APPLICATION FILED FEB. 14, 1912.

1,151,484.

Patented Aug. 24, 1915.
3 SHEETS—SHEET 1.

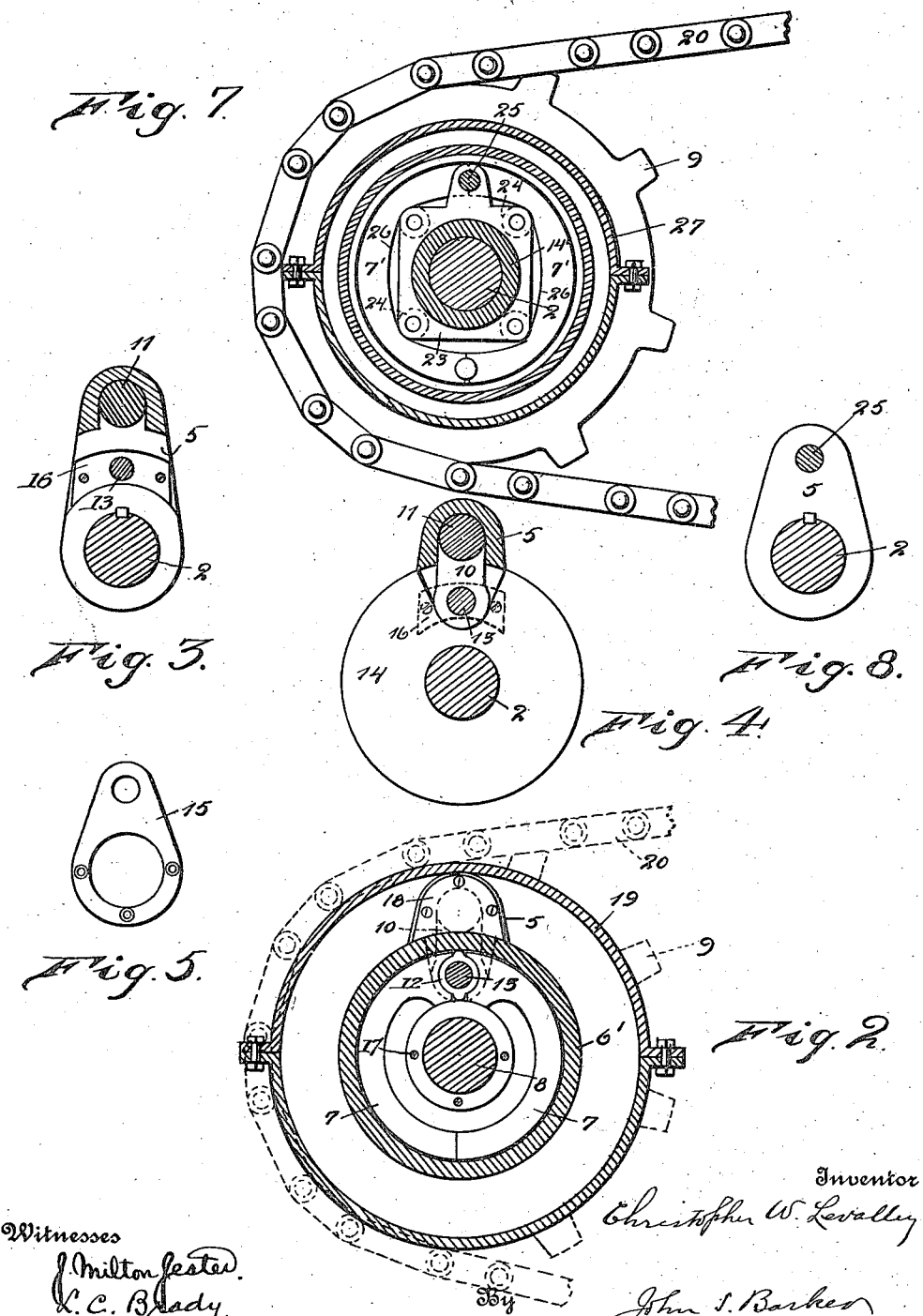

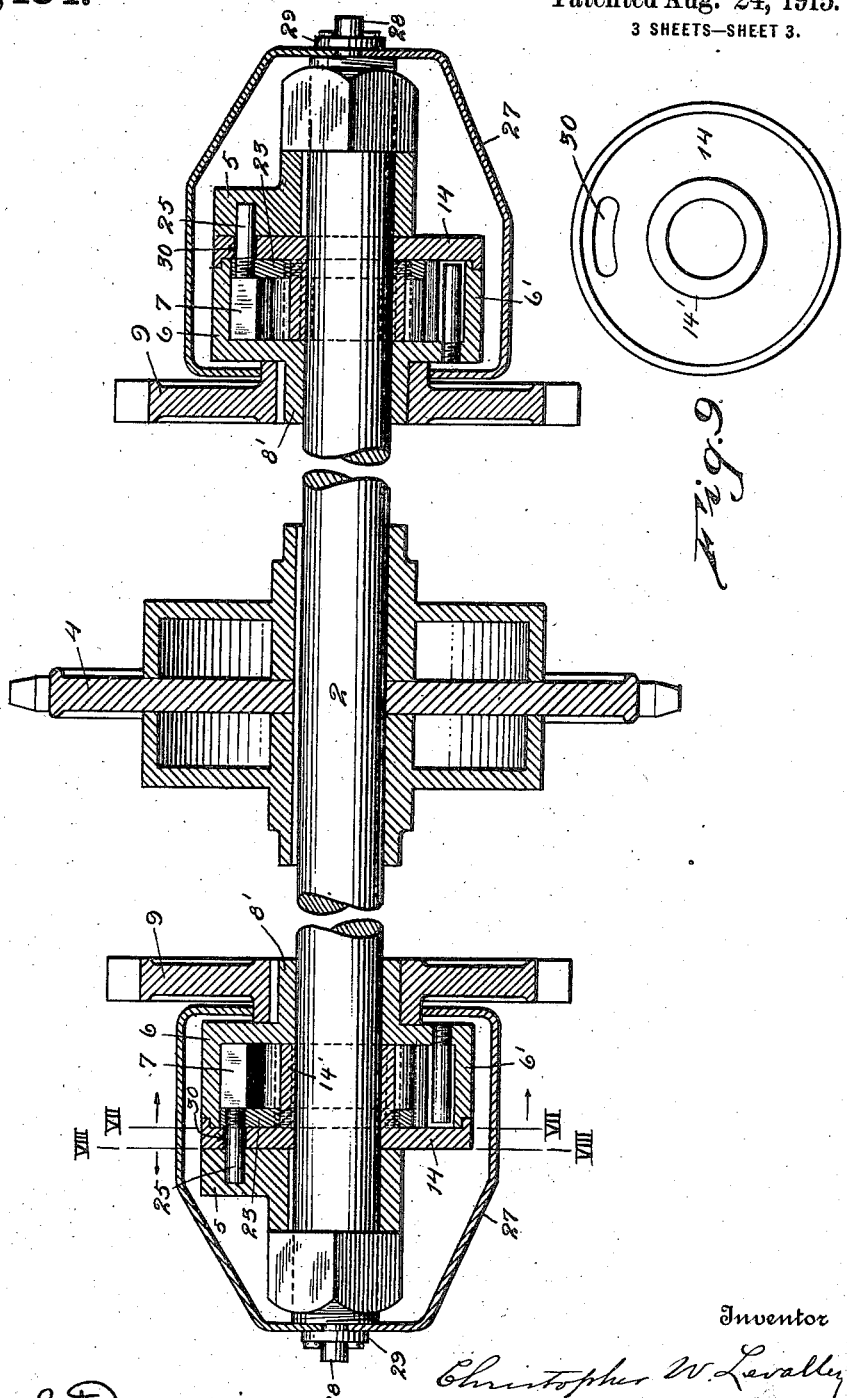

UNITED STATES PATENT OFFICE.

CHRISTOPHER W. LEVALLEY, OF MILWAUKEE, WISCONSIN.

TRANSMISSION-GEARING.

1,151,484.  Specification of Letters Patent.  Patented Aug. 24, 1915.

Application filed February 14, 1912. Serial No. 677,452.

*To all whom it may concern:*

Be it known that I, CHRISTOPHER W. LEVALLEY, a citizen of the United States, residing at Milwaukee, in the county of Milwaukee and State of Wisconsin, have invented certain new and useful Improvements in Transmission-Gearing, of which the following is a specification.

This invention relates to transmission gearing, particularly of the type adapted for use with motor driven vehicles such as are employed for commercial purposes, where the two traction wheels are driven through separate chain or gearing connections from a common motor-driven countershaft.

The invention has for its object to improve gearing of this type, adapting it to drive each wheel independently, and permitting the faster moving wheel—as the outer one when the vehicle is turning—to run freely and become disconnected from the power shaft.

In the drawings, Figure 1 is a central longitudinal sectional view taken through the countershaft of the mechanism. Fig. 2 is a cross sectional view taken on the line II—II of Fig. 1. Fig. 3 is a cross sectional view taken on the line III—IV of Fig. 1 as seen when viewed from the side indicated by the arrow *a*. Fig. 4 is a cross sectional view taken on the line III—IV of Fig. 1 as seen when viewed from the side indicated by the arrow *b*. Fig. 5 is a detail detached view, in elevation, of the bearing plate 15. Fig. 6 is a sectional view of an embodiment of the invention different from that illustrated in Fig. 1. Fig. 7 is a transverse sectional view taken on the line VII—VII of Fig. 6. Fig. 8 is a transverse sectional view taken on the line VIII—VIII of Fig. 6. Fig. 9 is a detail view, in elevation, of one of the supporting disks 14 shown in Fig. 6.

In the drawings, 2 indicates a power-driven shaft, such as a counter-shaft of a motor vehicle, supported in bearings 3 and carrying a gear 4, which, in the present illustration of my invention, stands for the connection, whatever its nature, between the shaft 2 and the motor.

8 indicates a shaft coaxial with shaft 2, and so supported that it is free to turn independently of the shaft 2.

In the form of the invention illustrated in Figs. 1 and 2 the shaft 8 is relatively short and in alinement with shaft 2, and is supported in a bearing or bearings 3'. Fixed to the shaft 8 is a sprocket wheel 9 that is connected by a chain belt 20 with a wheel upon a shaft or sleeve to which is secured one of the traction wheels. The parts designated 9 and 20 are typical of a train of gearing between the driven shaft 8 and the ultimate object to be driven, and may be varied to suit the conditions of use to which my invention is applied. Secured to the driven shaft 8 is a clutch member 6, preferably formed with an overhanging flange 6' having a clutch face with which engages the clutch shoe 7, the latter being supported within the chamber or space partially inclosed by the flange 6'.

5 designates an arm secured fast to the driven shaft 2. Interposed between the arm 5 and the clutch shoe is the member which operates the latter, it being, in that embodiment of the invention illustrated in Figs. 1 and 2, in the form of a lever 10, having at one end a pin 11 connecting it with the arm 5, and at the other end a head 12 engaging with the clutch shoe and arranged to expand it into working engagement with the clutch member 6 whenever the lever is rocked through a rotative movement of the shaft 2. The lever 10 is mounted in a plate 14 which serves not only as a carrier or support for this lever, but also as a face plate or cover for the open end of the clutch member 6. I prefer that the lever should be provided with trunnions 13 to serve as the fulcral supports therefor, and when these are used they have bearing in plates 15, 16, the former, the plate 15, (see Fig. 5) being secured by screws 17, to the hub 14' of the supporting disk 14, and the latter, the plate 16, being secured to the face of the disk.

18 designates a plate secured to the arm 5, and covering that end of the lever 10 which is seated therein, and serving as a dust guard. The entire clutch mechanism described is inclosed in a casing 19 supported by some stationary part of the apparatus, as for instance, by the boxes 3, 3', and serving to protect the parts which it incloses, and shield them from dust and dirt.

In Figs. 6 to 8 I have illustrated a different embodiment of my invention from that already described, in order thereby to demonstrate that the invention is not limited in its useful applications to a single specific device.

In this form of the invention the co-axial shaft carrying the gear 9 is tubular, as designated at 8', and surrounds and is supported directly by the drive shaft 2. The gear 9 is located at the inner side of the clutch mechanism connecting it with the drive shaft, instead of, as in the other form of the invention, being outside thereof. Each of these arrangements is at times to be preferred, depending largely upon the location of the ultimately driven parts.

The hollow shaft 8' carries a clutch member 6 with which engages an expansible shoe 7, the latter being preferably formed in two parts, 7', 7', adapted to be separated and forced into coöperative engagement with the clutch member 6. For effecting the movements of the segments 7' I employ the devices illustrated in Figs. 6 and 7.

The members 7', 7' of the shoe are of segmental shape and are fashioned exteriorly to engage with the contact or clutch member 6, while interiorly they are formed with a plurality, preferably four, of bearing surfaces 26 formed on arcs of circles of greater radius than that from the center of the shaft 2 to such surfaces.

23 is a plate or frame freely supported upon the hub 14' of the face plate 14 so as to be rotatable thereabout. It carries a set of rollers 24, preferably four of them, adapted to engage with the curved inner surfaces 26 of the segments of the clutch shoe. It is also provided with a laterally extending arm 25 projecting through an aperture 30 in the face plate 14 and engaging with the driving arm 5. The rollers 24 are in constant engagement with the inner surfaces of the segments of the clutch shoe and are located between them and the hub 14' of the face plate, though preferably they do not engage with the latter. When the frame 23 occupies one position—that illustrated in Fig. 7 and which I term its neutral position—the rollers 24 engage with the segments of the clutch shoes at the points where the curved surfaces 26 come together, and this permits the clutch segments 7' to approach each other sufficiently to free themselves from engagement with the clutch member 6. If, however, the frame 23 be turned, as by the rotation of the shaft 2 and its arm 5, the rollers 24 come into engagement with the bearing surfaces 26 of the clutch shoe and force the segments thereof outward into strong and direct engagement with the clutch member 6, and this takes place in whichever direction the frame 23 be turned.

The clutch and connecting mechanism just described is preferably inclosed in a protecting casing 27 that is secured to some rotating part, as for instance, to the clutch member 6 or to the hub of the wheel 9, as shown. This casing may be loosely centered upon a stud-like extension 28 of the shaft 2 upon which it is held by any suitable means, as a washer and split key designated 29.

It will be seen that, in both forms of the invention which I have described, the driving arm 5 is situated laterally to one side of the clutch, and that the outer end or portion of the clutch operating lever or frame is connected therewith. There are several advantages incident to this arrangement. It enables me to use a comparatively small clutch member—smaller than would be possible were the operating arm 5 located within the same plane as the clutch—it applies the power from the long arm of the lever and hence advantageously, and in that form of my invention illustrated in Figs 1 and 2, it enables me to bring the abutting ends of the co-axial shafts, 2 and 8, within the hub 14' of the plate 14, and hence within the confines of the clutch itself, thereby giving to these two shafts a very desirable support which insures their being maintained in alinement under all conditions of use.

Under normal conditions of driving, as for instance, when the vehicle is traveling along a straight piece of roadway, power is transmitted equally to each traction wheel through the connecting mechanisms which I have described. If for any reason one traction wheel is caused to rotate more rapidly than the other, as is the case with the outer wheel of a vehicle when it is describing a curve, the mechanism shown permits an instant separation or disconnection between such faster moving wheel and the driving shaft, as will be understood. From this it follows that the vehicle is always driven through the more slowly moving traction wheel, reducing the danger of the vehicle skidding or becoming stalled.

By employing driving gearing such as I have described it is entirely feasible, as I have demonstrated, to drive the vehicle through a single traction wheel, the other one being entirely free and disconnected from the motor, as for instance, should the connecting chain belt 20 become broken or lost.

What I claim is:—

1. The combination of a drive shaft, a pair of shafts co-axial therewith, clutches connected with the co-axial shafts, arms secured fast to the drive shaft and located each close to but laterally to one side of one of the clutches, and means for operating the clutches connected respectively with the said arms.

2. The combination of a drive shaft, a pair of driven shafts co-axial, and in alinement, therewith, independent clutches between the drive shaft and the co-axial driven shafts respectively, surrounding the abutting ends of the said alining shafts, and means for operating the clutches to bring them into working connections whenever the driving shaft is turned.

3. The combination of a drive shaft, a pair of driven shafts co-axial, and in alinement therewith, a clutch member connected with the inner end of each said co-axial shafts and surrounding the abutting ends of the alining shafts, a supporting plate covering the inner face of each said clutch member having a hub extending into the clutch and supported upon the shafts, the abutting ends of the shafts being within these hubs, arms secured to the driving shaft and located close beside the said plates, and means for operating the clutches, the said means being connected with the arms so as to be operated thereby.

4. The combination of a drive shaft, a pair of driven shafts co-axial, and in alinement, therewith, a clutch member connected with the inner end of each said co-axial shafts and surrounding the abutting ends of the alining shafts, a supporting plate covering the inner face of each said clutch member having a hub extending into the clutch and supported upon the shafts, the abutting ends of the shafts being within these hubs, clutch shoes located within the said clutch members and between them and the hubs of the said plates, arms secured to the driving shaft and located close beside the said plates, and means for moving the clutch shoes into engagement with the said clutch members connected with the said arms and extending through the said plates.

5. The combination of a drive shaft, a driven shaft co-axial therewith, a clutch connected with the driven shaft, an arm secured fast to the drive shaft and located close to but laterally to one side of the clutch, and means for operating the clutch connected with the said arm.

CHRISTOPHER W. LEVALLEY.

Witnesses:
JOHN S. BARKER,
GEO. B. PITTS.